US008812615B2

(12) United States Patent
Bailey et al.

(10) Patent No.: US 8,812,615 B2
(45) Date of Patent: Aug. 19, 2014

(54) REMOTE CONTROL OF A HOST COMPUTER

(75) Inventors: Scott A. Bailey, Mission Viejo, CA (US); Kevin Robert Lloyd, Mission Viejo, CA (US); Peyman Kazemian, Stanford, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 967 days.

(21) Appl. No.: 12/372,555

(22) Filed: Feb. 17, 2009

(65) Prior Publication Data

US 2010/0211882 A1    Aug. 19, 2010

(51) Int. Cl.
G06F 15/16      (2006.01)

(52) U.S. Cl.
USPC ........................................ 709/217

(58) Field of Classification Search
CPC .................................... H03M 7/3059
USPC .......... 709/217–219, 246–247; 345/613, 629, 345/638–639
See application file for complete search history.

(56) References Cited

U.S. PATENT DOCUMENTS

| | | | | |
|---|---|---|---|---|
| 5,768,561 | A * | 6/1998 | Wise | 710/63 |
| 5,874,960 | A | 2/1999 | Mairs et al. | |
| 6,018,349 | A * | 1/2000 | Szeliski et al. | 345/629 |
| 6,097,854 | A * | 8/2000 | Szeliski et al. | 382/284 |
| 6,304,895 | B1 * | 10/2001 | Schneider et al. | 709/203 |
| 6,675,387 | B1 * | 1/2004 | Boucher et al. | 725/105 |
| 6,704,024 | B2 * | 3/2004 | Robotham et al. | 345/581 |
| 7,171,444 | B2 | 1/2007 | Deshpande | |
| 7,711,795 | B2 * | 5/2010 | Getsin et al. | 709/217 |
| 2001/0034770 | A1 * | 10/2001 | O'Brien | 709/212 |
| 2002/0003543 | A1 * | 1/2002 | Deering | 345/581 |
| 2002/0032751 | A1 * | 3/2002 | Bharadwaj | 709/218 |
| 2003/0115318 | A1 * | 6/2003 | Wueste | 709/224 |
| 2003/0227969 | A1 * | 12/2003 | Wise et al. | 375/240.1 |
| 2004/0022444 | A1 * | 2/2004 | Rhoads | 382/232 |
| 2004/0215746 | A1 * | 10/2004 | McCanne et al. | 709/219 |
| 2005/0270305 | A1 * | 12/2005 | Rasmussen et al. | 345/613 |
| 2006/0132489 | A1 | 6/2006 | Blaho | |
| 2006/0282855 | A1 | 12/2006 | Margulis | |
| 2007/0183493 | A1 * | 8/2007 | Kimpe | 375/240.1 |

OTHER PUBLICATIONS http://en.wikipedia.org/wiki/Remote_Desktop_Protocol, last modified Feb. 13, 2009.
http://www.realvnc.com/, last accessed Feb. 17, 2009.
http://www.uvnc.com/index.html, 2008.
Tristan Richardson, "The RFB Protocol", last updated Aug. 28, 2008.
"Advantages and Implementation of HP Remote Graphics Software", Hewlett Packard Company, May 2007.

* cited by examiner

*Primary Examiner* — Rupal Dharia
*Assistant Examiner* — Marcus McKenzie
(74) *Attorney, Agent, or Firm* — Fitzpatrick, Cella, Harper & Scinto (57) ABSTRACT

A host computer splits a display of the host computer into a grid including a plurality of grid areas. The host computer tracks a rate of display updates in each grid area. In addition, the host computer calculates a weighted average of all of the grid areas that an updated region of the display overlaps. The weighted average is based on the rate of display updates of each overlapped grid area and the percentage of the updated region that overlaps each overlapped grid area. The host computer compresses the updated region using a compression method selected from plural different compression methods. The selected compression method is selected based on the weighted average. The host computer transmits the compressed updated region to the remote client device.

31 Claims, 8 Drawing Sheets

REMOTE CONTROL OF A HOST COMPUTER

FIELD

The present disclosure generally relates to remote control of a host computer, in which a remote client device accepts user inputs to control the host computer and displays output from the host computer.

BACKGROUND

Remote computing allows a user to control a host computer from a remote client device. A "remote" client device is a device which does not have physical access to the host computer, but communicates with the host computer via a transmission medium such as a network. In remote computing, the client device accepts input on behalf of the host computer, such as mouse movement or key presses, and displays what the host computer is displaying.

One method of displaying content of a host computer on a remote client device involves transmitting bitmap images of the screen of the host computer to the remote client device. This process is called "bitmap remoting". It is common to update the client display as quickly as possible, in order to keep the client display current with the host display. One common method of speeding up bitmap remoting includes compressing images before sending them to reduce their size.

SUMMARY

One problem with known bitmap remoting techniques is that they apply a single compression method at a time. Different compression methods have various advantages and disadvantages, but there are usually some circumstances where one compression technique is clearly more advantageous than others. While a user may be provided with an option to choose between compression methods, the chosen method is ordinarily applied to all applications at once. Thus, when a plurality of applications are simultaneously running on the host display, applying a new compression method might improve the display of some applications, but cause other applications to degrade in performance.

The foregoing situation is addressed by selecting appropriate compression methods for sub-regions of a display of the host computer, using the rate of display updates in the areas covered by each sub-region.

Thus, in an example embodiment described herein, a host computer splits a display of the host computer into a grid including a plurality of grid areas. The host computer tracks a rate of display updates in each grid area. In addition, the host computer calculates a weighted average of all of the grid areas that an updated region of the display overlaps. The weighted average is based on the rate of display updates of each overlapped grid area and the percentage of the updated region that overlaps each overlapped grid area. The host computer compresses the updated region using a compression method selected from plural different compression methods. The selected compression method is selected based on the weighted average. The host computer transmits the compressed updated region to the remote client device.

By selecting appropriate compression methods for sub-regions of a display of the host computer using the rate of display updates in areas covered by each sub-region, it is ordinarily possible to select compression methods better suited to the characteristics of each region of the display, thereby increasing the performance of the remote computing system. In addition, since the compression method is not based on the type of application being displayed, there is ordinarily no need to identify each type of application, or to try to anticipate appropriate compression methods for every conceivable type of application.

This brief summary has been provided so that the nature of this disclosure may be understood quickly. A more complete understanding can be obtained by reference to the following detailed description and to the attached drawings.

DETAILED DESCRIPTION

Figure 1:
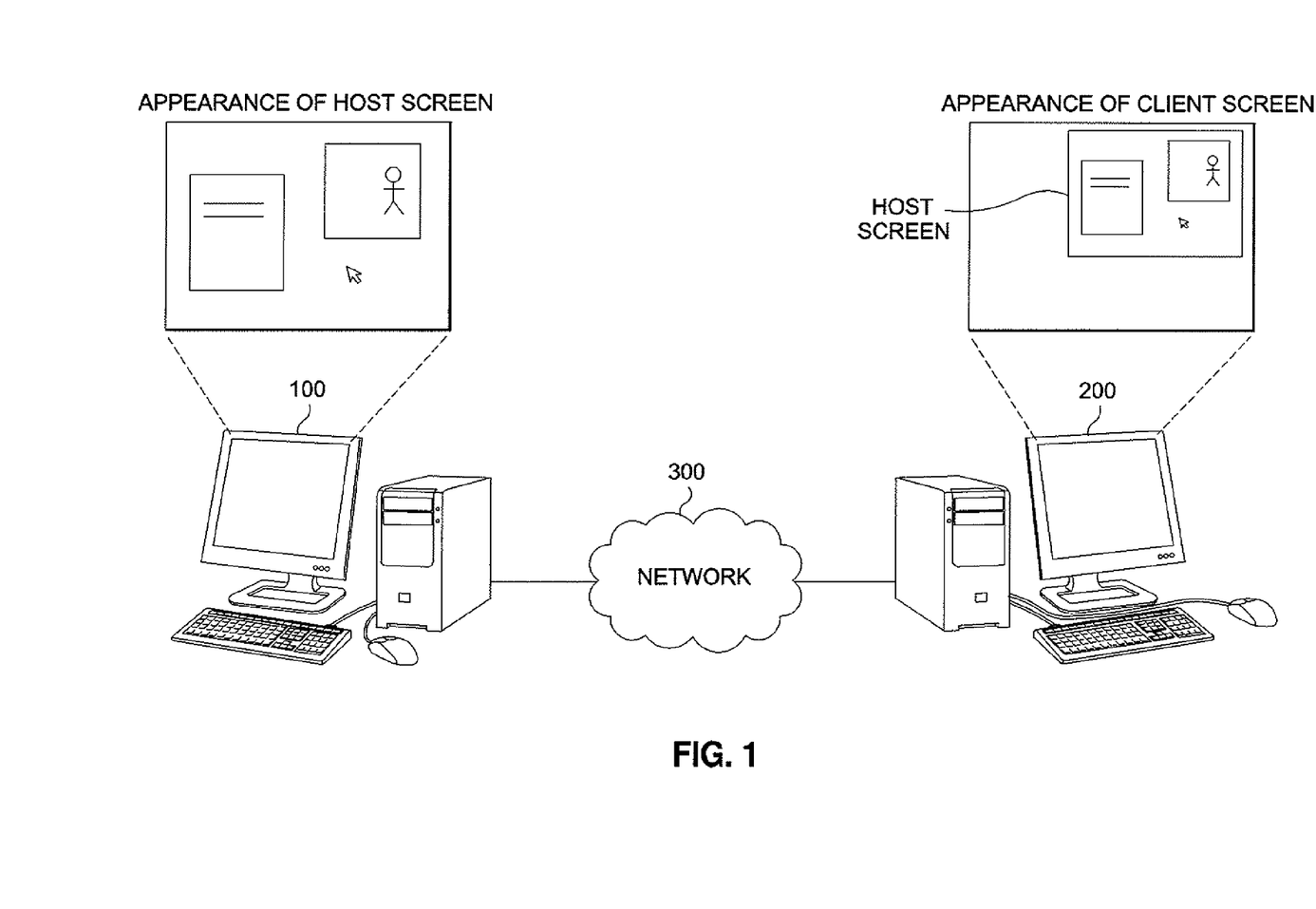
FIG. 1 illustrates an example of a client and host communicating in a network environment.

FIG. 1 illustrates an example remote computing environment. Host computer 100 is connected to client device 200 via network 300. Host computer 100 and client device 200 communicate via network 300 to transmit data and commands. As seen in FIG. 1, client device 200 displays what host computer 100 is displaying, and includes input devices such as a mouse or keyboard for accepting inputs on behalf of host computer 100.

The particular implementation, scale and hardware of network 300 may vary according to different embodiments. Thus, for example, network 300 could be the Internet, a Local Area Network (LAN), Wide Area Network (WAN), Metropolitan Area Network (MAN), or Personal Area Network (PAN), among others. Network 300 can be wired or wireless, and can be implemented, for example, as an Optical fiber, Ethernet, or Wireless LAN network. In addition, the network topology of network 300 may vary.

Figure 2:
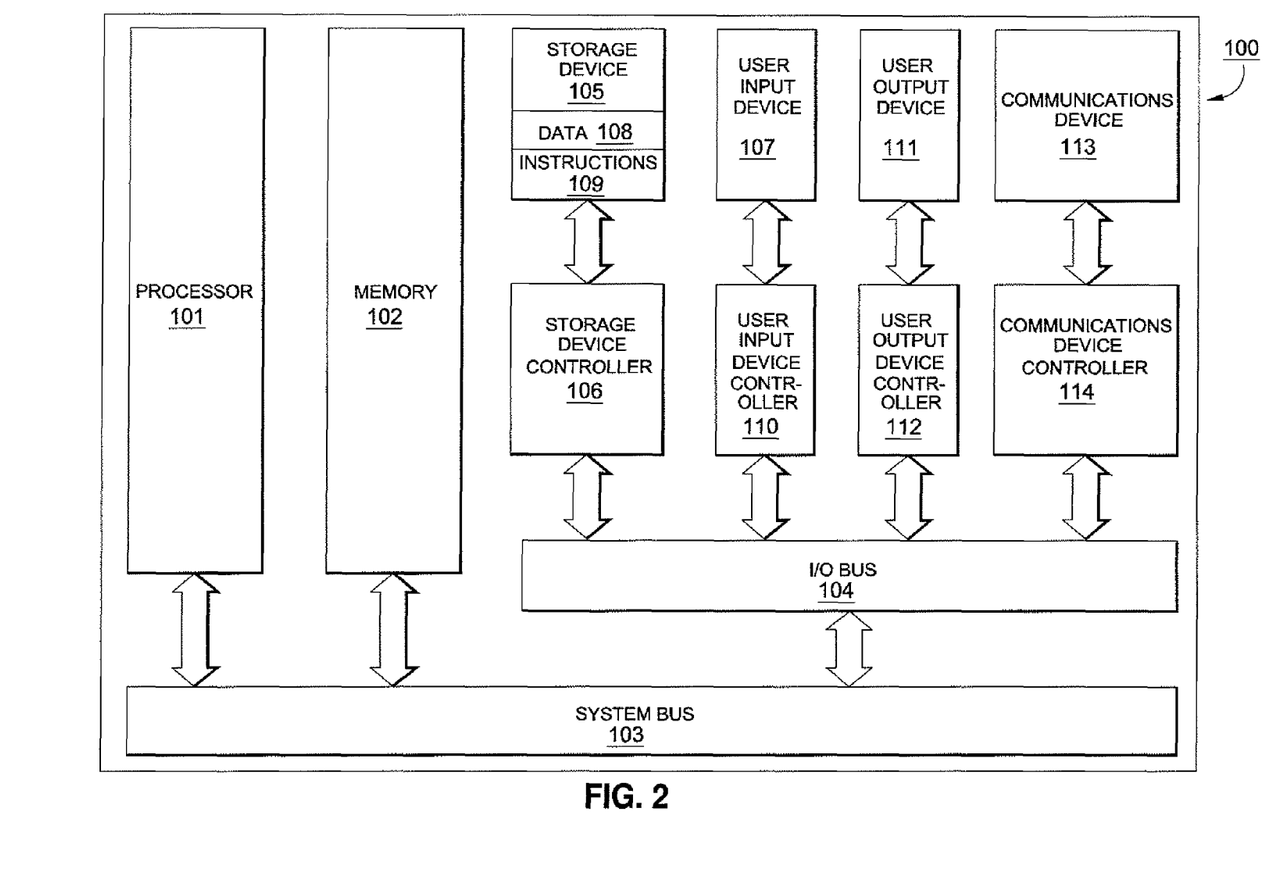
FIG. 2 illustrates an example embodiment of a host computer.

FIG. 2 is an architecture diagram of an example host computer. The elements may be implemented using hardcoded computational modules or other types of circuitry, or a combination of software and circuitry. Host computer 100 includes a processor 101 coupled to a memory 102 via system bus 103. Memory 102 can include, for example, a RAM, SDRAM, DDR SRAM, or flash memory. In operation, processor 101 loads the program instructions from storage device 105 into the memory 102. Processor 101 executes the loaded program instructions to implement a process for operating host computer 100 to be remotely controlled by remote client device 200 over network 300, and to select compression methods for sub-regions of a display of the host computer using the rate of display updates in areas covered by each sub-region, as described in more detail below.

Processor 101 is also coupled to external Input/Output (I/O) devices via the system bus 103 and an I/O bus 104. More specifically, the processor may be coupled to a user output device 111 via a user output device controller 112 coupled to the I/O bus 104. Output device 111 can include hardware such as a display monitor or a screen, and the display monitor or screen may display content such as a word document along with more rapidly changing content such as a media player. Output device controller 112 could be, for example, a separate video card or graphics controller. The processor 101 may be further coupled to a user input device 107 via a user input device controller 110 coupled to the I/O bus 104. User input devices can include hardware such as, for example, a keyboard, a mouse, a joystick, a trackball or a game controller, which allow a user of host computer 100 to input commands. In remote computing, however, client device 200 can also input commands to host computer 100.

A storage device 105 having computer-readable media is coupled to the processor 101 via a storage device controller 106, the I/O bus 104 and the system bus 103. For example, storage device 105 could include a hard disk drive. In one implementation, storage device 105 is used by processor 101 to store and read data 108 and program instructions 109 to be loaded into memory 102 in order to execute a process for operating host computer 100 to be remotely controlled by remote client device 200 over network 300, and to select compression methods for sub-regions of a display of the host computer using the rate of display updates in areas covered by each sub-region.

The processor 101 is further coupled to a communications device 113 via a communications device controller 114 coupled to the I/O bus 104. The processor uses the communications device 113 to communicate with another device over network 300. More specifically, communication device 113 allows host computer 100 to communicate with client device 200 over network 300. In this regard, communications device 113 may be a network interface card (NIC) and may be configured to transmit data via a multitude of protocols. To that end, communications device 113 may include multiple hardware interfaces or ports to allow communication via different transmission protocols.

Figure 3:
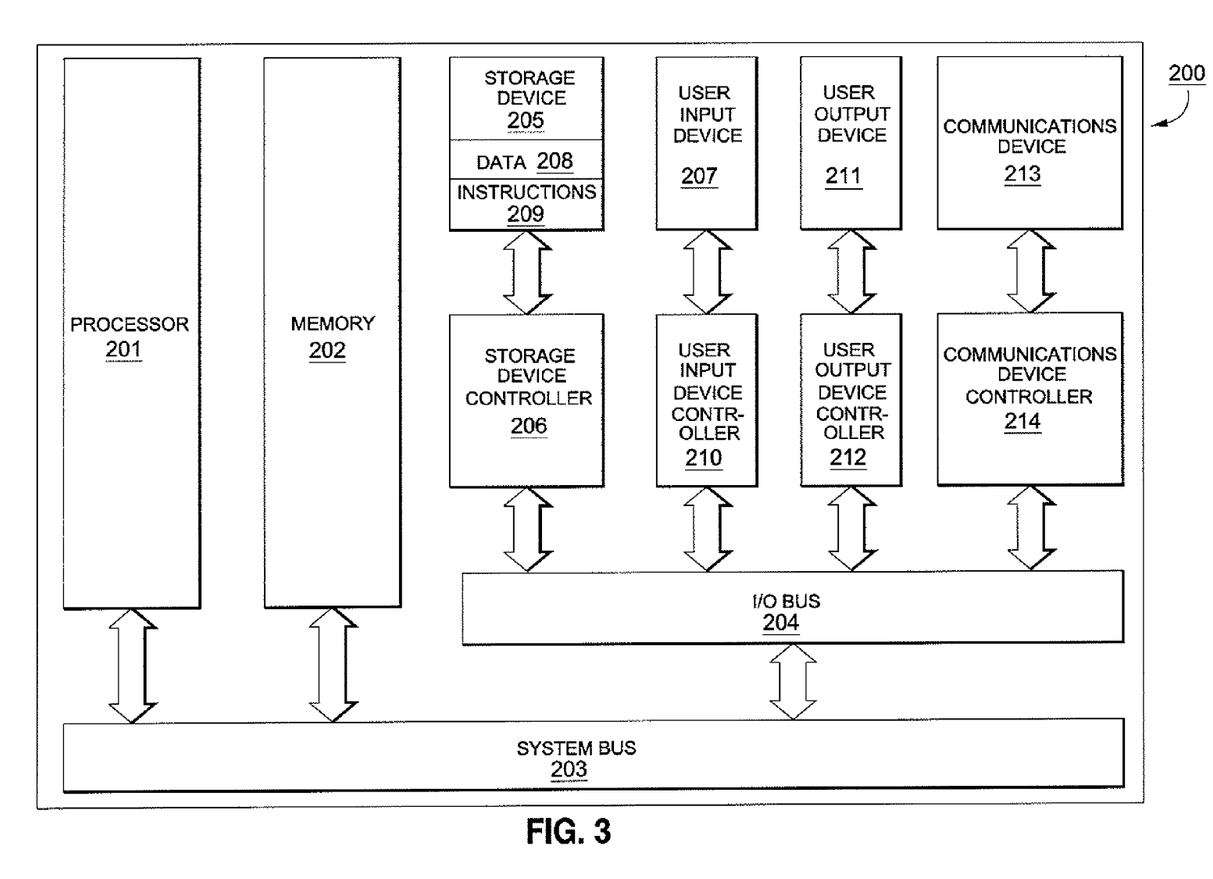
FIG. 3 illustrates an example embodiment of a client device.

FIG. 3 is an architecture diagram of an example embodiment of a client device. The elements may be implemented using hardcoded computational modules or other types of circuitry, or a combination of software and circuitry. Client device 200 includes a processor 201 coupled to a memory 202 via system bus 203. Memory 202 can include, for example, a RAM, SDRAM, DDR SRAM, or flash memory. In operation, processor 201 loads the program instructions from storage device 205 into the memory 202. Processor 201 executes the loaded program instructions to implement a process to remotely control host computer 100 over network 300, and to decode and display compressed display regions received from host device 100.

Processor 201 is also coupled to external Input/Output (I/O) devices via the system bus 203 and an I/O bus 204. More specifically, processor 201 may be further coupled to a user output device 211 via a user output device controller 212 coupled to the I/O bus 204. The output devices can include, for example, a display monitor or a screen, and the display monitor or screen may display content such as a word document along with more rapidly changing content such as a media player. In remote computing, the display on output device 211 can include or mirror the display on output device 111 at host computer 100. Output device controller 212 could be, for example, a separate video card or graphics controller. The processor 201 may be further coupled to a user input device 207 via a user input device controller 210 coupled to the I/O bus 204. Input devices can include hardware such as, for example, a keyboard, a mouse, a joystick or a game controller, among many others. Input devices at client device 200 can be used to send input to client device 200. In remote computing, however, input devices at the client device 200 also accept commands on behalf of host computer 100, such as user interface commands.

A storage device 205 having computer-readable media is coupled to the processor 201 via a storage device controller 206, the I/O bus 204 and the system bus 203. For example, storage device 205 could include a hard disk drive. In one implementation, storage device 205 is used by processor 201 to store and read data 208 and program instructions 209 to be loaded into memory 202 in order to execute a process for operating client device 200 to remotely control host computer 100 over network 300, and to decode and display compressed display regions received from host device 100.

The processor 201 is further coupled to a communications device 213 via a communications device controller 214 coupled to the I/O bus 204. The processor may use the communications device 213 to communicate with another device over network 300. More specifically, communication device 213 allows client device 200 to communicate with host computer 100 over network 300. In this regard, communications device 213 be a network interface card (NIC) and may be configured to transmit data via a multitude of protocols. To that end, communications device 213 may include multiple hardware interfaces or ports to allow communication via different transmission protocols.

Physically, client device 200 can be embodied as a number of devices, including, for example, a computer as shown in FIG. 1, a cellular telephone, a portable media player, a personal digital assistant (PDA), a laptop computer, or a television, among many other embodiments.

During remote computing, client device 200 acts as a separate input/output for host computer 100. Specifically, client device 200 accepts input such as user interface commands, and client device 200 displays what host computer 100 is displaying.

As indicated above, one method of displaying content of a host computer on a remote client device involves transmitting bitmap images of the screen of the host computer to the remote client device.

However, as discussed above, known bitmap remoting techniques apply a single compression method at a time. Thus, when a plurality of applications are simultaneously running on the host display, applying a new compression method might improve the display of some applications, but cause other applications to degrade in performance.

Therefore, a process of selecting compression methods for sub-regions of a display of the host computer will now be described with respect to FIGS. 4 to 10.

The process will be described from the perspective of host computer 100 with respect to FIG. 4, and from the perspective of client device 200 with respect to FIG. 5. It should be understood that some steps in the processes are performed continuously, or only as needed, and therefore that the particular order and sequence of steps might change. In this regard, the process in the host computer 100 can be stored in storage device 105 as process steps which are executed by processor 101 to perform the functionality of host computer 100. Conversely, the process in the client device 200 can be stored in storage device 205 as process steps which are executed by processor 201 to perform the functionality of the client device 200.

Figure 4:
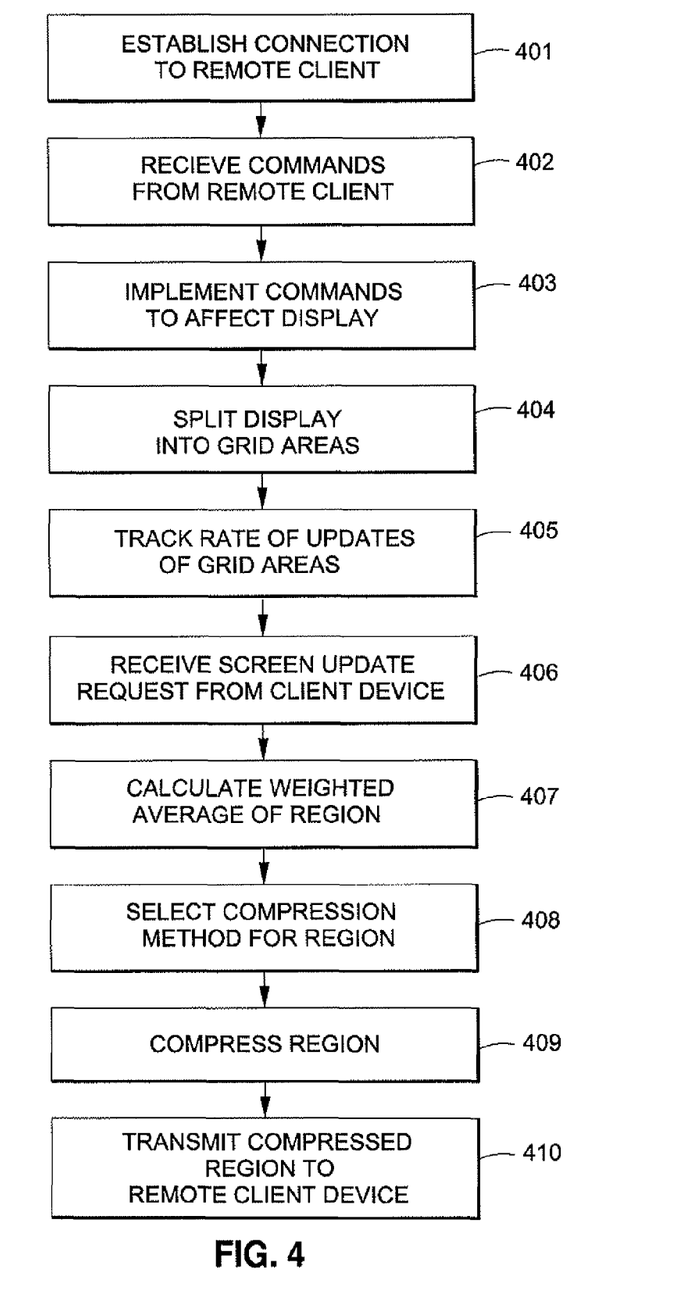
FIG. 4 is a flowchart illustrating an example process in the host computer.

Briefly, as shown in FIG. 4, host computer 100 establishes a connection to remote client device, and receives commands from remote client device 200 and implements the commands so as to affect a display of host computer 100. In addition, the host computer splits a display of the host computer into a grid including a plurality of grid areas. The host computer tracks a rate of display updates in each grid area. The host computer receives a request for a screen update from the client device. The host computer calculates a weighted average of all of the grid areas that an updated region of the display overlaps. The weighted average is based on the rate of display updates of each overlapped grid area and the percentage of the updated region that overlaps each overlapped grid area. The host computer compresses the updated region using a compression method selected from plural different compression methods. The selected compression method is selected based on the weighted average. The host computer transmits the compressed updated region to the remote client device.

Turning to FIG. 4, the process in host computer 100 starts in step 401, where a connection is established with remote client device 200. The connection might be initialized by host computer 100 or by client device 200. Establishing a connection may also include preliminary negotiations between host computer 100 and client device 200. For example, host computer 100 and client device 200 might negotiate to ensure that they both support the same compression methods, as discussed below.

In step 402, host computer 100 receives commands from client device 200. For example, common commands would include user interface commands input at client device 200, such as a key press or movement of a cursor via a mouse.

In step 403, host computer implements the commands from client device 200 to affect the display, as if the user at client device 200 were sitting at the host computer. Thus, for example, host computer 100 adjusts its display to correspond to a user clicking on a desktop folder.

In step 404, host computer 100 splits its display into a grid including a plurality of grid areas. In this regard, the dimensions of each grid area could be based, for example, on the screen size of output device 111. In other examples, the grid areas could be set by the user or by host computer 100 based on performance or hardware statistics, such as how long it takes to track updates for given grid dimensions, the resolution of output device 111, and so on. In one example, the relative locations and dimensions of the grid areas on the screen could be stored in memory as a table, a list, or an array, along with a counter value to be described more fully below.

Figure 8:
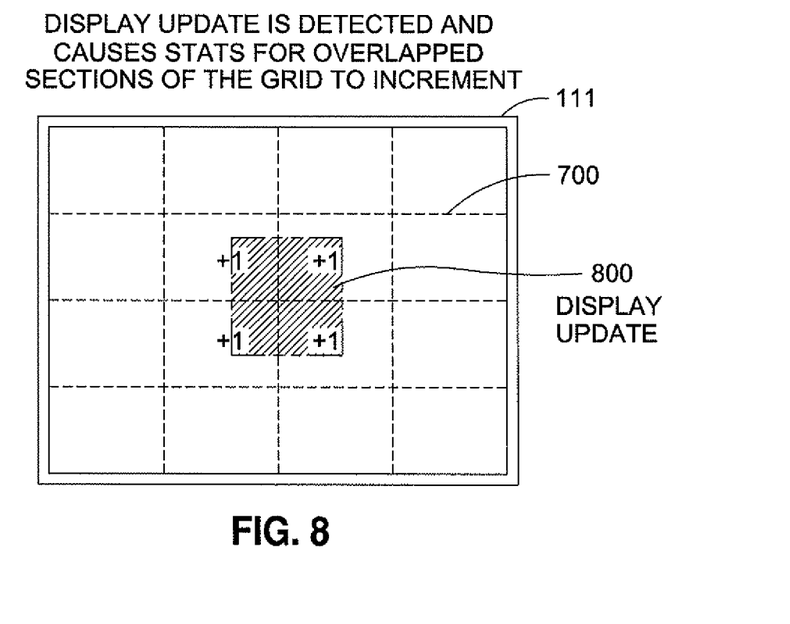
FIG. 8 illustrates an example of tracking a rate of display updates in grid areas when a display update is drawn to the screen of the host computer.

In step 405, host computer 100 tracks the rate of display updates in each grid area. For example, host computer 100 could detect updates to the screen and increment a counter for each corresponding grid area. An example of incrementing counters for respective grid areas is shown in FIG. 8.

Numerous methods of tracking display updates are possible. For example, host computer 100 could track "paint" commands from the operating system (not shown) which indicate that something is being drawn to the screen, and then use the coordinates of the command to determine which grid areas are overlapped by the resultant drawn object. The corresponding counter for each overlapped grid areas could then be incremented.

The counters for each grid area are also repeatedly decremented after a period time. Otherwise, it is possible that the counter for each grid area would quickly ramp up to very high values, making later distinctions between the proper compression methods based on the counter values difficult. The amount of time between decrements could be set by a user, or by host computer 100 based on, for example, performance statistics, screen resolution, or other factors.

In step 406, host computer 100 receives a request for a screen update from client device 200. At this time, host computer 100 stores a snapshot of the display in memory in order to compress and transmit the latest updated regions on the screen, as discussed below.

An "updated region" will now be described in more detail, as contrasted with the multiple "display updates" which are tracked for each grid area. Briefly, "display update" refers to an object or item drawn to the screen by each paint command, whereas "updated region" refers to a larger sub-region of the host computer display at the time host computer 100 stores a snapshot of the screen in memory for transmission to client device 200.

In more detail, in remote computing environments it may be difficult or impossible to compress and transmit every display update (i.e., object) drawn to the display screen by a paint command. For example, in some situations, thousands of paint commands may be being issued from the operating system at the same time (or nearly the same time), and trying to compress and transmit every single drawn item might flood client device 200 with data it can not use, crash the operating system, or flood the network. In addition, it may not be possible to specifically determine whether each paint command is being used for the same or overlapping regions or applications, whether paint commands are otherwise related, and so on. Thus, while the coordinates of paint commands can be examined for the simple purpose of updating the corresponding counters in grid areas, trying to compress and transmit each object drawn to the screen by each paint command might be difficult or impossible.

One example method of addressing the above is for a host computer to consolidate display updates into larger regions, and to send a bitmap including the consolidated regions only when the client requests a screen update. More specifically, host computer 100 accumulates objects or items drawn by the paint commands, and sections out parts of the screen that are being updated rapidly and combines these sections to create larger (and useful) updated regions. The consolidation of these display sections can be performed using a number of known consolidation algorithms, and thus will not be described here in further detail.

Thus, when the client device requests a screen update, the host computer stores a snapshot of the current contents of the screen in memory. According to the present disclosure, it is the updated regions existing at the time of the snapshot which are captured, compressed and transmitted from host computer 100 to client device 200.

In this regard, while each separate updated region on the screen at the time of the client request is compressed and transmitted, for purposes of conciseness the remaining steps are described with reference to a single updated region. It should also be understood that each updated region is typically less than the size of the entire host display, i.e., each updated region is a sub-region of the host display.

In step 407, host computer 100 calculates a weighted average of all of the grid areas that an updated region of the display overlaps.

Figure 9:
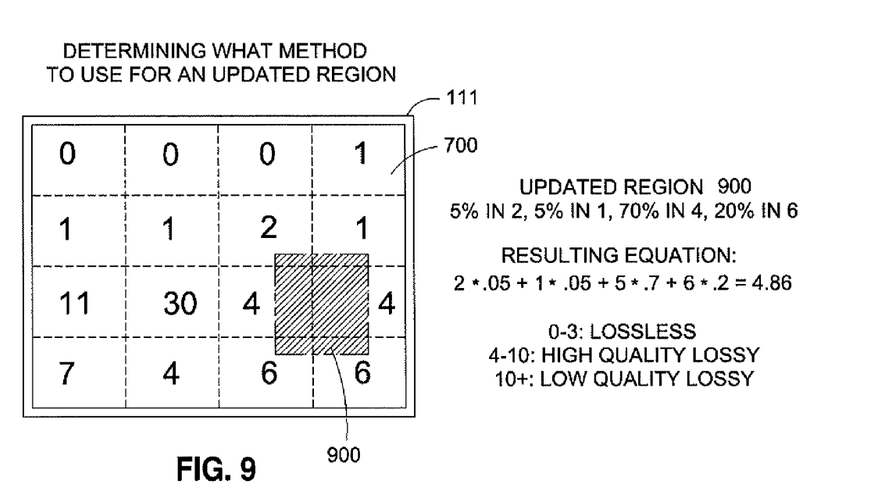
FIG. 9 illustrates a conceptual view for determining which compression method to use for transmitting an updated region of the display.

The weighted average for an updated region on the screen is based on the rate of display updates of each grid area overlapped by the updated region, and the percentage of the updated region that overlaps each overlapped grid area. More specifically, as discussed above, a counter for each grid area is updated each time a display update overlaps that grid area. An example of different counter values is shown in FIG. 9, along with an updated region to be compressed and transmitted. As shown in FIG. 9, the weighted average for the updated region is computed by multiplying the respective counter value for each overlapped grid area with the percentage of the updated region that overlaps that grid area, and computing the sum of these values for all overlapped grid areas. The resultant value for each updated region can then be mapped to a specific compression method.

In step 408, host computer 100 selects a compression method for the updated region, based on the weighted average calculated for the updated region. For example, as shown in FIG. 9, a weighted average between 0 to 3 could correspond to selecting a lossless compression method, whereas a weighted average between 4 and 10 might correspond to a high quality lossy compression method. Of course, other divisions and compression methods are possible.

The selection of a compression method may also include mapping a compression ID to each updated region, to be appended to the updated region during transmission. For example, both host device 100 and client device 200 could store a library of compression IDs corresponding to different compression methods (and/or different compression encoders and decoders). Thus, when host computer 100 selects a compression method for a particular area, it appends the corresponding compression ID to be transmitted with the image data, so that client device 200 knows which type of compression decoder to use to translate and display the image data of the region.

In such a case, the selection of compression methods may be limited by the compression methods supported by the client. For example, client device 200 may not support every compression method supported by host computer 100. Thus, as indicated above with respect to step 401, in one example host computer 100 and client device 200 negotiate to ensure that only compression methods supported by the libraries of both host computer 100 and client device 200 are used in the process.

In step 409, host computer 100 compresses the updated region using the selected compression method and the appropriate compression encoder.

In step 410, host computer transmits the compressed updated region, possibly along with an appropriate compression ID, to client device 200.

The process from the perspective of client device 200 will now be described with respect to FIG. 5.

Figure 5:
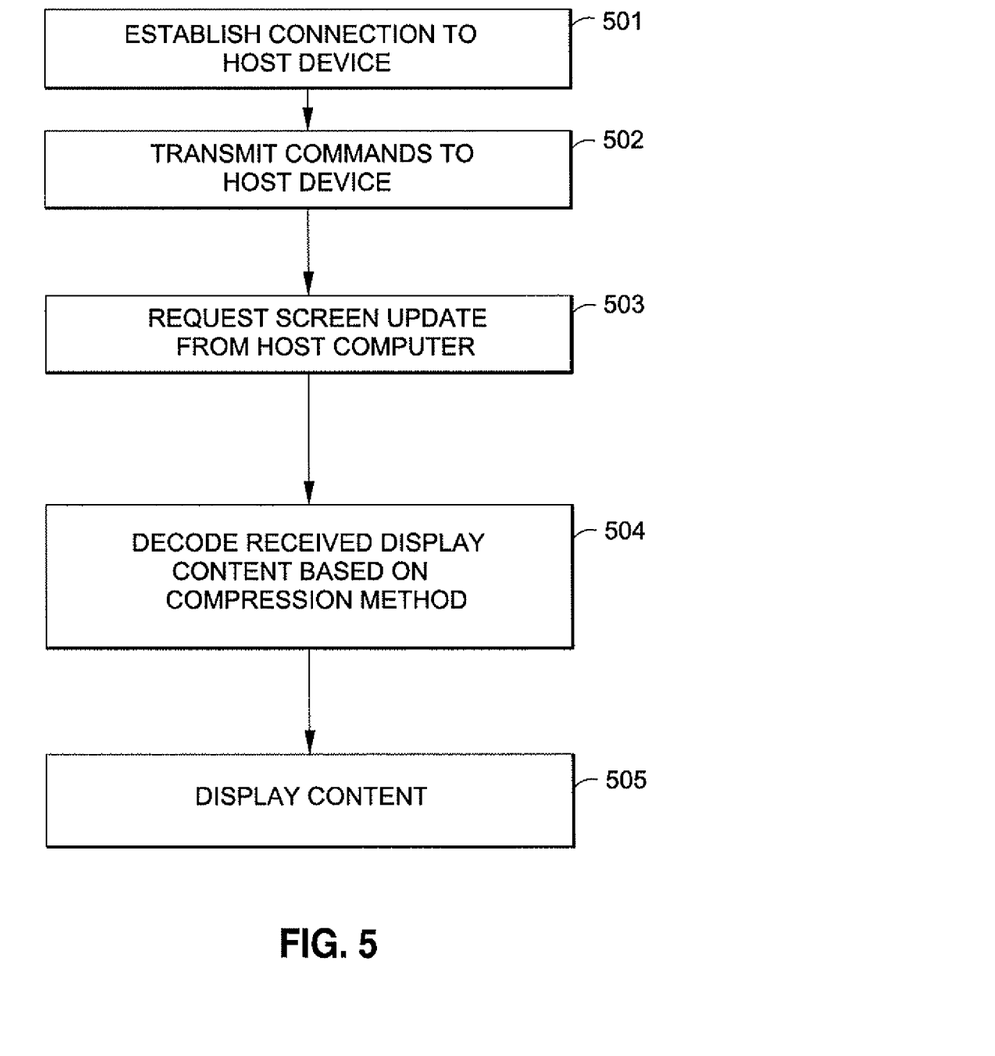
FIG. 5 is a flowchart illustrating an example process in the client device.

Briefly, in FIG. 5, client device 200 establishes a connection to host computer 100, and transmits commands to host computer 100. Client device 200 requests a screen update from host computer 100, and decodes the received display content based on a selected compression method. Client device 200 then displays the decompressed display content.

In step 501, client device 200 establishes a connection to host computer 100. As discussed above, client device 200 may also conduct preliminary negotiations with host computer 100, such as determining whether the compression libraries of host computer 100 and client device 200 match.

In step 502, client device 200 transmits commands to host computer 100 to control host computer 100. For example, client device 200 could transmit user interface commands to host computer 100 such as key inputs or mouse movements.

In step 503, client device 200 requests a screen update from host computer 100. In one example, the rate of requests from client device 200 might be increased or decreased by, for example, a user request, the performance or size of client device 200, or the current transmission performance over network 300.

In step 504, client device 200 decodes compressed display content received from host computer 100, based on the selected compression method. The decoder used by client device 200 might be based on a compression ID appended to the display content, as discussed above. For example, if the compression ID received along with the display region is "5", client device 200 examines its decoder library to find the corresponding decoder (e.g., "JPEG decoder").

In step 505, client device 200 displays the content decoded in step 504.

While FIG. 5 is described with respect to a single client device, in another example embodiment, host computer 100 could be a server which conducts the above processes with respect to a number of client devices at once. Thus, the server could store different updated regions for each client, and compress and transmit regions as clients request them.

Figure 6:
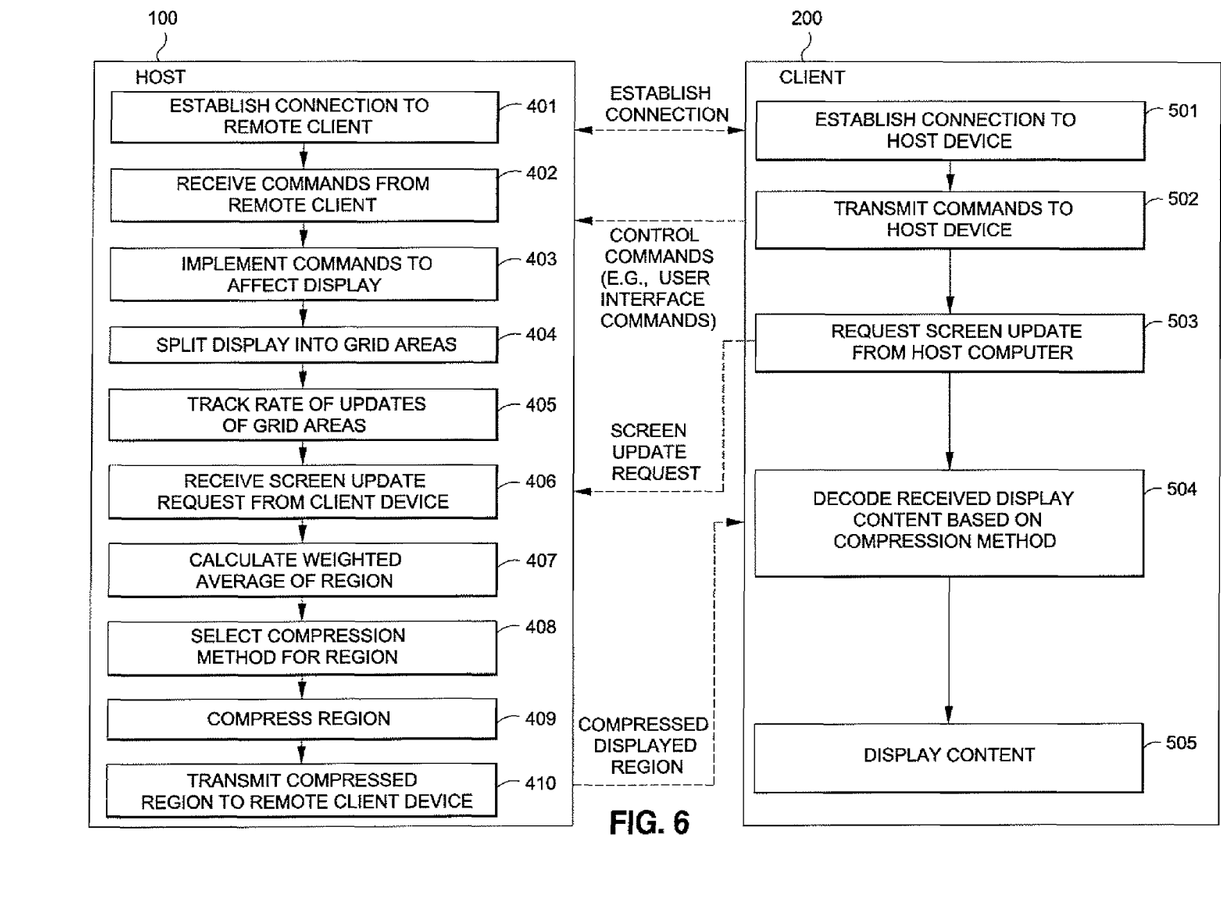
FIG. 6 illustrates interactions between the processes of the host computer and the client device.

FIG. 6 is a flow diagram illustrating interactions between the processes of host computer 100 and client device 200. As can be seen from FIG. 6, both host computer 100 and client device 200 establish a connection. Host computer 100 receives commands (e.g., user interface commands) and a request for a screen update from client device 200, and transmits a compressed displayed region to client device 200. Client device 200 transmits commands to host computer 100 and transmits a request for a screen update, and receives compressed displayed region from host computer 100.

Figure 7:
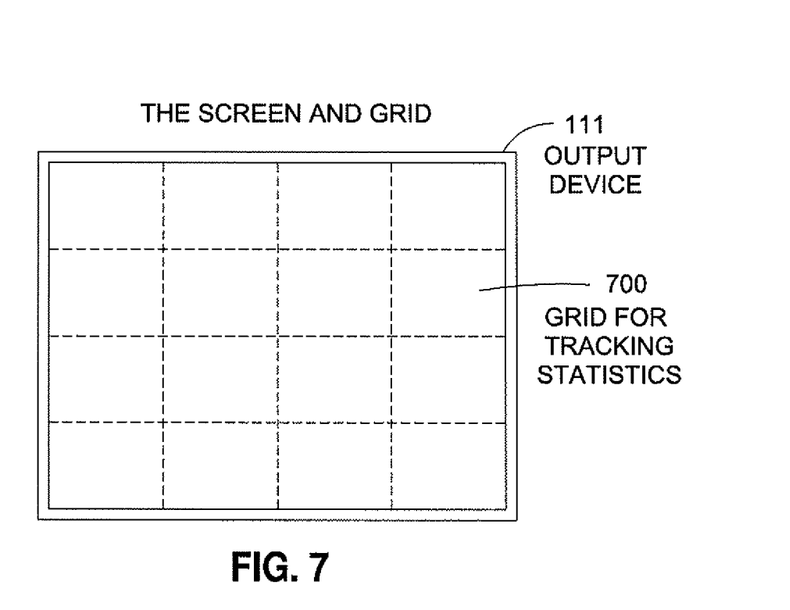
FIG. 7 illustrates an example of a display of a host computer which has been divided into a grid.

FIG. 7 illustrates an example of a screen of output device 111 (on host computer 100) divided into a grid 700.

FIG. 8 illustrates an example of updating counters of grid areas when a display update 800 is drawn to the screen of the host computer. Specifically, as discussed above, one way to monitor the rate of display updates in each grid area is to update a counter for each grid area each time an item is displayed in the grid area. FIG. 8 depicts this example, as each of the grid areas overlapped by the display update is incremented by "1".

FIG. 9 illustrates a conceptual view for determining which compression method to use for transmitting an updated region. Specifically, FIG. 9 shows the counter value of each grid area before the snapshot of the screen has been stored in memory to be sent to the client after the client requests a screen update. Updated region 900 is also displayed on the grid at the time of the snapshot, and thus is to be transmitted to client device 200 using a selected compression method. FIG. 9 depicts the calculation of a compression method for updated region 900, based on the counter values of each overlapped grid area, as well as the percentage of updated region 900 which overlaps each overlapped grid area.

Figure 10:
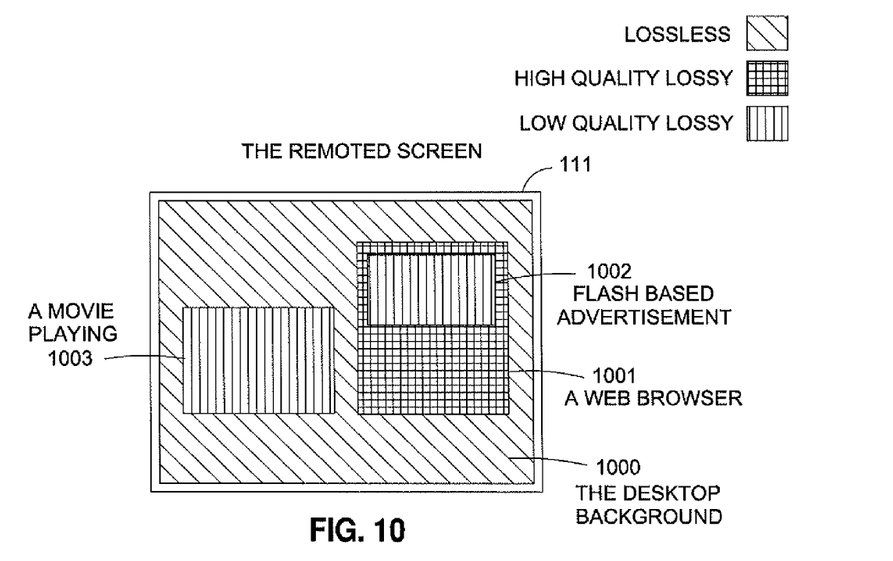
FIG. 10 illustrates a conceptual view of different compression methods for different updated regions of the host computer display.

FIG. 10 illustrates a conceptual view of example different compression methods for different updated regions of the host computer screen. In the example shown in FIG. 10, desktop background 1000 is compressed using a lossless compression method, web browser 1001 is compressed using a high quality lossy compression method, and flash advertisement 1002 and movie 1003 are both compressed using a low quality lossy compression method.

By virtue of the above-described arrangements, it is ordinarily possible to select compression methods better suited to the characteristics of each region of the display, thereby increasing the performance of the remote computing system. In addition, since the compression method is not based on the type of application being displayed, there is ordinarily no need to identify each type of application, or to try to anticipate appropriate compression methods for every conceivable type of application.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method of operating a host computer which is remotely controlled over a network by a remote client device, comprising:
   splitting a display of the host computer into a grid including plural grid areas, each of which containing pixels;
   tracking a rate of display updates in the plural grid areas;
   calculating a weighted average of the grid areas that an updated region of the display overlaps, wherein the weighted average is calculated by multiplying the rate of display updates of each overlapped grid area with the percentage of the updated region that overlaps each overlapped grid area;
   selecting a compression method from plural different compression methods including a lossless compression method and a lossy compression method, wherein the compression method is selected based on the weighted average which is calculated by multiplying the rate of display updates of each overlapped grid area with the percentage of the updated region that overlaps each overlapped grid area;
   compressing the updated region using a compression method selected from the plural different compression methods including the lossless method and the lossy method; and
   transmitting the compressed updated region to the remote client device.

2. The method according to claim 1, wherein the rate of display updates in each grid area is tracked by incrementing a respective counter for each grid area in which a display is updated.

3. The method according to claim 2, wherein the respective counter for each grid area is decremented after a period of time.

4. The method according to claim 1, wherein the updated region is appended with a compression ID.

5. The method according to claim 4, wherein both the host computer and the remote client device contain compression libraries, and wherein the host computer or remote client device maps the compression ID to a compression decoder or compression encoder to translate the data of the updated region.

6. The method according to claim 5, wherein the remote client device displays the updated region to a display of the remote client device after decoding the data of the updated region with a compression decoder.

7. The method according to claim 5, wherein the host computer and remote client device negotiate to determine compression methods supported by both the host computer and the remote client device.

8. The method according to claim 1, wherein the host computer transmits the compressed updated region to multiple client devices.

9. The method according to claim 1, wherein multiple updated regions are displayed on the host computer, and different compression methods are selected for each of the multiple updated regions.

10. The method according to claim 1, further comprising:
    calculating a second weighted average of all of the grid areas that a second updated region of the display overlaps, wherein the second weighted average is calculated by multiplying the rate of display updates of each overlapped grid area that the second updated region of the display overlaps with the percentage of the second updated region that overlaps each overlapped grid area;
    compressing the second updated region using a second compression method selected from plural different compression methods, wherein the selected second compression method is selected based on the second weighted average and is different from the compression method selected for the updated region; and
    transmitting the compressed second updated region to the remote client device.

11. A host computer which is remotely controlled over a network by a remote client device, comprising:
    a splitting unit constructed to split a display of the host computer into a grid including plural grid areas, each of which containing pixels;
    a tracking unit constructed to track a rate of display updates in the plural grid areas;
    a calculating unit constructed to calculate a weighted average of all of the grid areas that an updated region of the display overlaps, wherein the weighted average is calculated by multiplying the rate of display updates of each overlapped grid area with the percentage of the updated region that overlaps each overlapped grid area;
    a selecting unit constructed to select a compression method from plural different compression methods including a lossless compression method and a lossy compression method, wherein the compression method is selected based on the weighted average which is calculated by multiplying the rate of display updates of each overlapped grid area with the percentage of the updated region that overlaps each overlapped grid area;
    a compression unit constructed to compress the updated region using a compression method selected from the plural different compression methods including the lossless method and the lossy method; and
    a transmission unit constructed to transmit the compressed updated region to the remote client device.

12. The computer according to claim 11, wherein the rate of display updates in each grid area is tracked by incrementing a respective counter for each grid area in which a display is updated.

13. The computer according to claim 12, wherein the respective counter for each grid area is decremented after a period of time.

14. The computer according to claim 11, wherein the updated region is appended with a compression ID.

15. The computer according to claim 14, wherein both the host computer and the remote client device contain compression libraries, and wherein the host computer or remote client device maps the compression ID to a compression decoder or compression encoder to translate the data of the updated region.

16. The computer according to claim 15, wherein the remote client device displays the updated region to a display of the remote client device after decoding the data of the updated region with a compression decoder.

17. The computer according to claim 15, wherein the host computer and remote client device negotiate to determine compression methods supported by both the host computer and the remote client device.

18. The computer according to claim 11, wherein the host computer transmits the compressed updated region to multiple client devices.

19. The computer according to claim 11, wherein multiple updated regions are displayed on the host computer, and different compression methods are selected for each of the multiple updated regions.

20. The computer according to claim 11, further comprising:
- a second calculating unit for calculating a second weighted average of all of the grid areas that a second updated region of the display overlaps, wherein the second weighted average is calculated by multiplying the rate of display updates of each overlapped grid area that the second updated region of the display overlaps with the percentage of the second updated region that overlaps each overlapped grid area;
- a second compression unit for compressing the second updated region using a second compression method selected from plural different compression methods, wherein the selected second compression method is selected based on the second weighted average and is different from the compression method selected for the updated region; and
- a second transmission unit for transmitting the compressed second updated region to the remote client device.

21. A computer-readable memory medium on which is retrievably stored computer-executable process steps for operating a host computer which is remotely controlled over a network by a remote client device, the process steps comprising:
- splitting a display of the host computer into a grid including plural grid areas, each of which containing pixels;
- tracking a rate of display updates in the plural grid areas;
- calculating a weighted average of all of the grid areas that an updated region of the display overlaps, wherein the weighted average is calculated by multiplying the rate of display updates of each overlapped grid area with the percentage of the updated region that overlaps each overlapped grid area;
- selecting a compression method from plural different compression methods including a lossless compression method and a lossy compression method, wherein the compression method is selected based on the weighted average which is calculated by multiplying the rate of display updates of each overlapped grid area with the percentage of the updated region that overlaps each overlapped grid area;
- compressing the updated region using a compression method selected from the plural different compression methods including the lossless method and the lossy method; and
- transmitting the compressed updated region to the remote client device.

22. The computer-readable medium according to claim 21, wherein the rate of display updates in each grid area is tracked by incrementing a respective counter for each grid area in which a display is updated.

23. The computer-readable medium according to claim 22, wherein the respective counter for each grid area is decremented after a period of time.

24. The computer-readable medium according to claim 21, wherein the updated region is appended with a compression ID.

25. The computer-readable medium according to claim 24, wherein both the host computer and the remote client device contain compression libraries, and wherein the host computer or remote client device maps the compression ID to a compression decoder or compression encoder to translate the data of the updated region.

26. The computer-readable medium according to claim 25, wherein the remote client device displays the updated region to a display of the remote client device after decoding the data of the updated region with a compression decoder.

27. The computer-readable medium according to claim 25, wherein the host computer and remote client device negotiate to determine compression methods supported by both the host computer and the remote client device.

28. The computer-readable medium according to claim 21, wherein the host computer transmits the compressed updated region to multiple client devices.

29. The computer-readable medium according to claim 21, wherein multiple updated regions are displayed on the host computer, and different compression methods are selected for each of the multiple updated regions.

30. The computer-readable medium according to claim 21, further comprising:
- calculating a second weighted average of all of the grid areas that a second updated region of the display overlaps, wherein the second weighted average is calculated by multiplying the rate of display updates of each overlapped grid area that the second updated region of the display overlaps with the percentage of the second updated region that overlaps each overlapped grid area;
- compressing the second updated region using a second compression method selected from plural different compression methods, wherein the selected second
- compression method is selected based on the second weighted average and is different from the compression method selected for the updated region; and
- transmitting the compressed second updated region to the remote client device.

31. The host computer according to claim 11, wherein the host computer comprises a computer-readable memory constructed to store computer-executable process steps; and
- a processor constructed to execute the computer-executable process steps stored in the memory,
- wherein the process steps stored in the memory cause the processor to perform steps corresponding to the splitting unit, the tracking unit, the calculating unit, the compression unit and the transmission unit.

* * * * *